Jan. 19, 1954   C. W. BERTHIEZ   2,666,367
MOUNTING OF ROTATING HORIZONTAL TABLES IN MACHINE TOOLS
Filed June 2, 1950   2 Sheets-Sheet 1
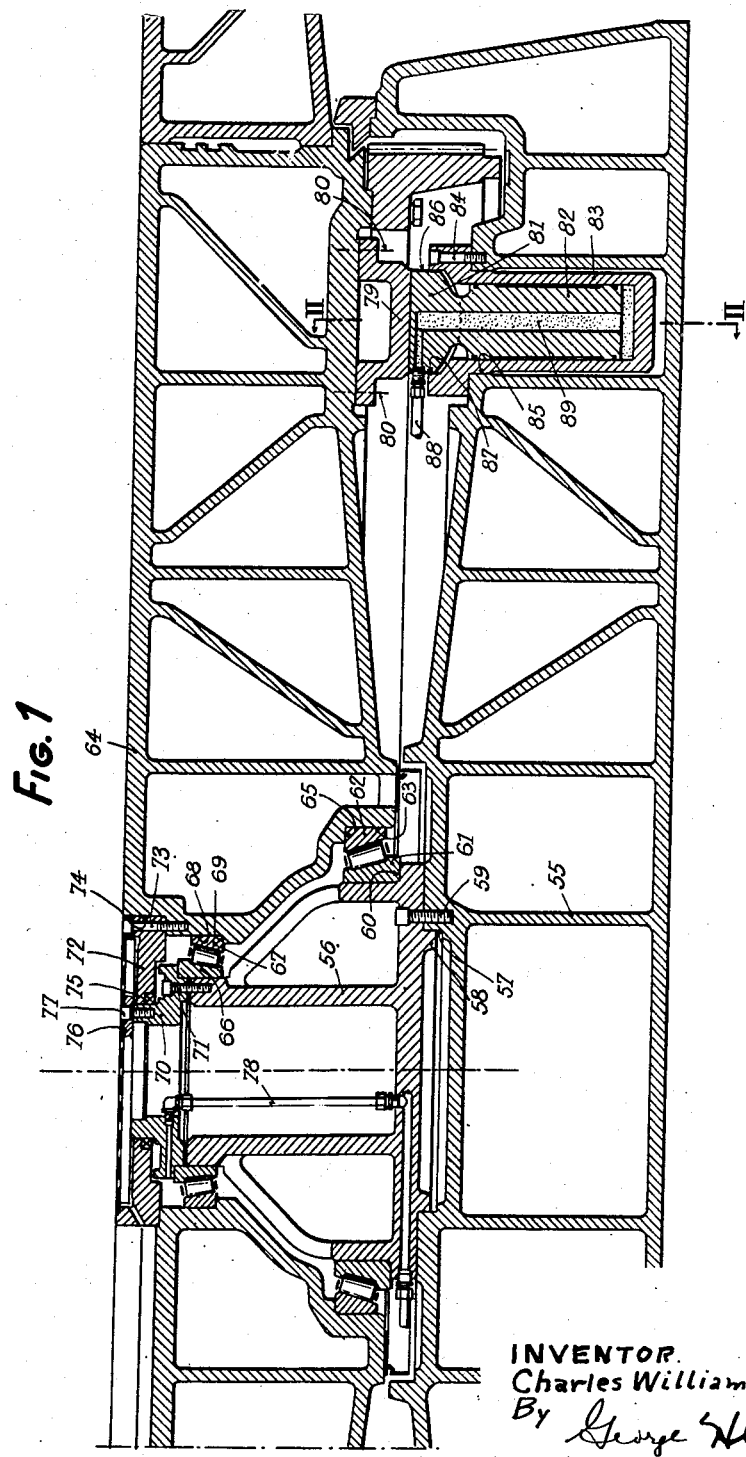
INVENTOR.
Charles William Berthiez
By George Hearey
ATTORNEY Jan. 19, 1954 C. W. BERTHIEZ 2,666,367
MOUNTING OF ROTATING HORIZONTAL TABLES IN MACHINE TOOLS
Filed June 2, 1950 2 Sheets-Sheet 2
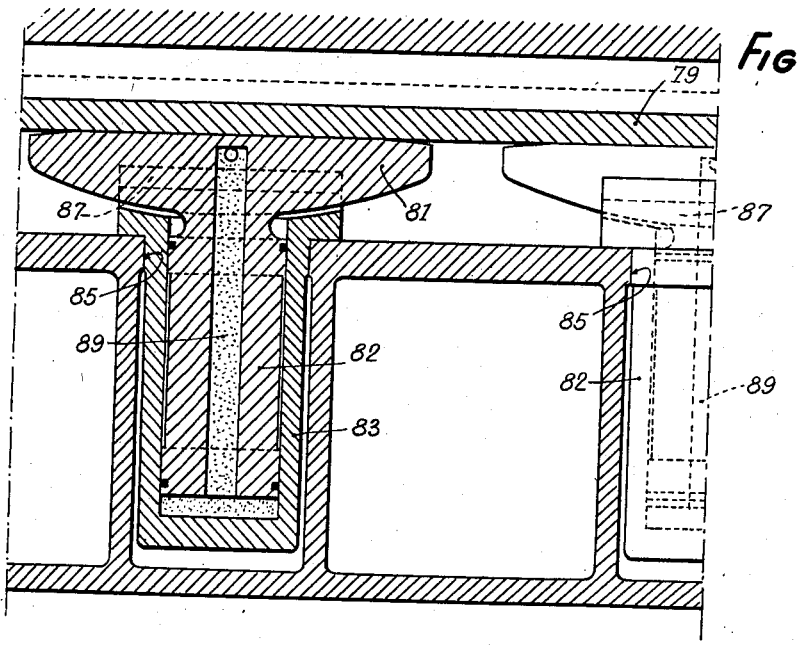
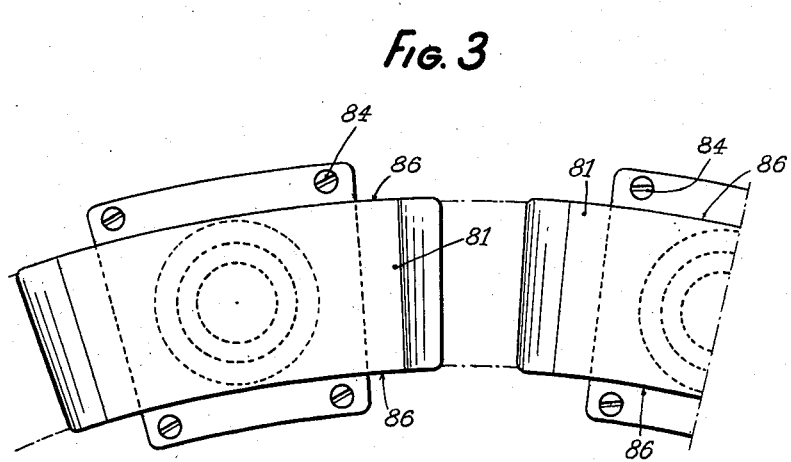
INVENTOR
Charles William Berthiez
By George N. Corey
ATTORNEY

Patented Jan. 19, 1954

2,666,367

UNITED STATES PATENT OFFICE 2,666,367

MOUNTING OF ROTATING HORIZONTAL TABLES IN MACHINE TOOLS

Charles William Berthiez, La Cote Bizy
Vernon, France

Application June 2, 1950, Serial No. 165,835

Claims priority, application France July 29, 1949

9 Claims. (Cl. 90—58)

1

Methods are already known which make it possible to distribute correctly, between a roller-bearing surface and an annular sliding bearing, the weight of a horizontal turntable of a machine and substantially to maintain such distribution regardless of operating conditions.

Such methods have been applied in particular to the installation of a rotating horizontal machine table, for instance a turntable of a vertical lathe.

In such cases the lower element of the roller-bearing was generally subjected to an upward vertical thrust.

In the device forming the subject matter of this invention, on the other hand, it is the lower or supporting element of the sliding bearing that is subjected to the vertical thrust. This arrangement makes it possible to retain the elevation of the turntable strictly constant irrespective of its rate of rotation and of the well known variation of the thickness of the oil film with variation of speed. This result offers advantages in some specific machining operations. If, for example, machining operations are to be performed on a large diameter workpiece over various diameters thereof, or, further, if a surface of large area is to be machined accurately to a given form with a constant cutting speed, it becomes necessary to impart to the turntable variable rates of rotation to equalize as much as possible the cutting speed at different diameters. As a result the thickness of the oil film formed between the surfaces of the annular sliding bearing increases as the turntable is rotated at a faster speed. Accordingly, in the exemplary machining operation under consideration the invention provides means by which the turntable is not subjected to any slight vertical displacement due to a variation in the thickness of the oil film as such displacement would cause the surface being machined to be not strictly planar or true to other desired form.

According to the invention the turntable rests simultaneously upon a centrally disposed roller or other rolling element bearing and upon a peripherally disposed sliding bearing the upper element of which is rigid with the rotary turntable while the lower element is slightly movable in a vertical direction and is subjected to an upwardly-directed thrust which is preferably adjustable.

Preferably only a limited number of portions of the lower element of the sliding bearing are movable and are subjected to this thrust.

Further features of the invention will be understood from the ensuing description and a study

2 of the accompanying drawing given merely by way of example and in which:

Figure 1 illustrates a half vertical section of one exemplary embodiment of a machine-tool turntable mounting according to the invention;

Figure 2, left, shows a section on the line II—II of Figure 1 and, right, a similar fragmental section but in which some parts are shown in elevation, the sectional views being developed on the plane of the drawing and drawn on an enlarged scale; and Figure 3 is a fragmental plan view corresponding to Figure 2, with the turntable removed.

In the drawing the invention is assumed to be applied to a vertical lathe but it is obvious that it would also be applicable to any machine-tool, or to any machine comprising a horizontal turntable.

As shown, resting upon the bed 55 of the vertical lathe is a pivot support 56 centered in a counterbore 57 of the bed by a bead 58. The pivot support is secured to the bed by screws 59 and comprises a base flange 60 upon which bears the inner race 61 of a large capacity taper roller bearing the outer race 62 of which is housed in a counterbore 63 of the turntable 64. The turntable rests upon the race 62 through a shoulder 65.

Fitted about the top of the pivot support 56 is the inner race 66 of another taper roller bearing the outer race 67 of which is housed in a counterbore 68 formed in the top of the hub of turntable 64 and bears on a shoulder 69 of this turntable counterbore. A cap 70 secured on the top of the pivot support 56 with screws 71 insures that the inner race 66 of the upper roller bearing is retained against movement in a vertical direction. Fitted around the cap 70 so as to be rotatable relative thereto is a ring 72 secured with screws 73 in a recess 74 formed in the top of the hub of turntable 64. A gasket 75 prevents dust and foreign materials from penetrating into the roller bearings between the peripheral surfaces of the cap 70 and of the ring 72. A closure cover 76 is secured on the cap 70 with screws 77. Finally, a pipe 78 delivers lubricating oil to the roller bearings.

Thus, the turntable 64 rests with its central portion upon the bed 55 of the vertical lathe through the agency of the roller bearings. It is supported also, however, adjacent its periphery by sliding surfaces the arrangement of which forms the subject matter of the present invention.

In the drawing an annular slideway member 79 providing a downwardly facing flat surface is shown which is rotatable with the turntable 64, being secured to the under side of the turntable by means of screws indicated merely by their centre lines 80. This slideway 79 rests on a plurality of vertically movable shoes 81 each provided with a shank or piston 82 slidable in a cylinder 83 secured by screws 84 in a bore 85 formed in the bed 55. The vertical travel of the shoes 81 is very short and these shoes are guided for such movement at their side faces 86 by and in sliding relation to complementary faces 87 of an annular groove formed in the top flange portion of the cylinder 83 (see especially Figures 1 and 3). The piston 82 of the shoes and the cylinders 83 provide hydraulic jack units into which oil is delivered under constant pressure through pipes 88 to ducts 89 extending through the pistons 82 over the full length thereof to the spaces in the cylinders beneath the pistons 82.

Operation of the device just described is as follows:

The oil pressure in the hydraulic jacks is so adjusted that the upward vertical thrust exerted by the shoes 81 on the rotary slideway 79 will balance a considerable part of the weight of the turntable and of the workpiece mounted on it.

The turntable is then set into rotation and, as it gathers speed, a film of oil supplied by conventional means builds up between the rotating slideway and the shoes which has the effect of slightly depressing the shoes and the pistons 82 and consequently forcing a small amount of oil under pressure into the pipe 88 from the space beneath the pistons 82. As the turntable revolves faster the thickness of the oil film increases and accordingly the shoes are moved further downwardly and force more oil into the pipe 88. Since, however, the oil pressure in the hydraulic jacks is constant it will be observed that in this way, regardless of the thickness of the oil film and therefore of the speed of rotation of the turntable, not only will the initial load distribution between the revolving slideway and the roller bearings be maintained but, moreover, the turntable will remain strictly at the same elevation.

It will be understood that the invention is not restricted to the embodiment described and illustrated given merely by way of example.

Moreover, the above-described device might in some cases be advantageously applied to machines other than machine-tools.

What I claim is:

1. In a machine tool or the like the combination with a frame of the machine, and a turntable supported on said frame for rotation on an axis and held against longitudinal movement along said axis, said turntable having a surface extending about and generally transversely of said axis, of a shoe disposed in sliding bearing relation to said surface of said turntable as said turntable turns and supported for movement of said shoe toward and away from said surface transversely thereof, and means providing a yieldable thrust of substantially constant strength and operatively connected to said shoe to urge said shoe into bearing engagement with said surface with a substantially constant force while providing for movement of said shoe away from and toward said surface to compensate respectively for increase and decrease in the thickness of the oil film between said shoe and said surface upon rotation of said turntable.

2. In a machine tool or the like, the combination with a bed of the machine, and a turntable supported on said bed for rotation on a vertical axis, said turntable having at the underside thereof a downwardly facing surface extending about and generally transversely of said axis, of a shoe disposed beneath and in sliding bearing relation to said downwardly facing surface of said turntable as said turntable turns and supported for vertical movement of said shoe toward and away from said surface, and means providing a hydraulic cushion at substantially constant pressure and operatively connected to said shoe to urge said shoe upwardly into bearing engagement with said surface with a substantially constant force while providing for movement of said shoe away from and toward said surface to compensate respectively for increase and decrease in the thickness of the oil film between said shoe and said downwardly facing surface upon rotation of said turntable.

3. In a machine tool or the like, the combination with a bed of the machine, and a turntable supported on said bed for rotation on a vertical axis, said turntable having at the underside thereof a downwardly facing surface extending about and generally transversely of said axis, of a shoe disposed beneath and in sliding bearing relation to said downwardly facing surface of said turntable as said turntable turns and supported for vertical movement thereof toward and away from said surface, a hydraulic jack having a member supported in said jack for movement thereof upwardly and downwardly and connected to said shoe for effecting movement thereof upwardly and downwardly toward and away from said surface, and means connected to said hydraulic jack and providing a hydraulic cushion at a substantially predetermined pressure of the hydraulic fluid supplied to said jack to maintain substantially constant the upwardly directed force of said movable member of said jack and said shoe in bearing engagement with said surface while providing for downward and upward movement of said movable member and said shoe to compensate respectively for increase and decrease in the thickness of the oil film between said shoe and said downwardly facing surface of said turntable upon rotation of said turntable.

4. In a machine tool or the like the combination as defined in claim 1, and a centering bearing supported on said frame and engaging said turntable to maintain said turntable in position for rotation on said axis.

5. In a machine tool or the like the combination as defined in claim 1, and a bearing supported on said frame and engaging said turntable centrally in relation to said axis with respect to said surface extending about said axis and cooperating with said shoe and said surface to support the load of said turntable acting parallel to said axis.

6. In a machine tool or the like the combination as defined in claim 9 which comprises a plurality of shoes disposed in spaced relation to each other about said axis of rotation of said turntable in sliding bearing relation to said surface of said turntable, said means providing a hydraulic cushion at substantially constant pressure being operatively connected to said shoes to urge said shoes substantially simultaneously into bearing engagement with said surface of said turntable.

7. In a machine tool or the like the combination as defined in claim 6 in which said surface of said turntable is an annular surface extending continuously completely about said axis to receive the bearing of said shoes.

8. In a machine tool or the like the combination as defined in claim 9 in which said means providing said hydraulic cushion comprises a cylinder, a piston in said cylinder operatively connected at a given end thereof to said shoe to move said shoe toward and away from said surface of said turntable upon movement of said piston forwardly and reversely in said cylinder, said piston having a duct extending therethrough generally parallel to the axis of said cylinder and communicating with the space between said cylinder and said piston at the end of said piston opposite to said given end thereof, and means for delivering to said duct and therethrough to said space a hydraulic fluid at a substantially constant pressure in all positions of said piston along said cylinder.

9. In a machine tool or the like the combination with a frame of the machine, and a turntable supported on said frame for rotation on an axis and held against longitudinal movement along said axis, said turntable having a surface extending about and generally transversely of said axis, of a shoe disposed in sliding bearing relation to said surface of said turntable as said turntable turns and supported for movement of said shoe toward and away from said surface transversely thereof, and means providing a hydraulic cushion at substantially constant pressure and operatively connected to said shoe to urge said shoe into bearing engagement with said surface with a substantially constant force while providing for movement of said shoe away from and toward said surface to compensate respectively for increase and decrease in the thickness of the oil film between said shoe and said surface upon rotation of said turntable.

CHARLES WILLIAM BERTHIEZ.

References Cited in the file of this patent

UNITED STATES PATENTS

| Number | Name | Date |
|---|---|---|
| 2,025,250 | Smith | Dec. 24, 1935 |
| 2,155,680 | Pfauter | Apr. 25, 1939 |
| 2,183,362 | Zimmerman et al. | Dec. 12, 1939 |

FOREIGN PATENTS

| Number | Country | Date |
|---|---|---|
| 465,389 | France | Apr. 15, 1914 |